(12) United States Patent
Rothstein et al.

(10) Patent No.: US 11,296,967 B1
(45) Date of Patent: Apr. 5, 2022

(54) COMBINING PASSIVE NETWORK ANALYSIS AND ACTIVE PROBING

(71) Applicant: ExtraHop Networks, Inc., Seattle, WA (US)

(72) Inventors: Jesse Abraham Rothstein, Seattle, WA (US); Benjamin Thomas Higgins, Shoreline, WA (US); Michael Kerber Krause Montague, Lake Forest Park, WA (US); Kevin Michael Seguin, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 17/483,435

(22) Filed: Sep. 23, 2021

(51) Int. Cl.
*H04L 12/26* (2006.01)
*H04L 29/08* (2006.01)
*H04L 43/0876* (2022.01)
*H04L 43/062* (2022.01)
*H04L 67/30* (2022.01)
*H04L 43/12* (2022.01)

(52) U.S. Cl.
CPC ........ *H04L 43/0876* (2013.01); *H04L 43/062* (2013.01); *H04L 43/12* (2013.01); *H04L 67/30* (2013.01)

(58) Field of Classification Search
None
See application file for complete search history.

(56) References Cited

U.S. PATENT DOCUMENTS

| 5,027,269 A | 6/1991 | Grant et al. |
| 5,430,727 A | 7/1995 | Callon |
| 5,541,995 A | 7/1996 | Normile et al. |

(Continued)

FOREIGN PATENT DOCUMENTS

| CN | 109542772 A1 | 3/2019 |
| EP | 1026867 A2 | 8/2000 |

(Continued)

OTHER PUBLICATIONS

Office Communication for U.S. Appl. No. 13/831,673 dated Sep. 30, 2013, pp. 1-10.

(Continued)

*Primary Examiner* — Ranodhi Serrao
(74) *Attorney, Agent, or Firm* — John W. Branch; Branch Partners PLLC

(57) ABSTRACT

Embodiments are directed monitoring network traffic using network monitoring computers. Metrics may be determined based on monitoring network traffic associated with entities in the network such that the metrics may be included in profiles associated each entity. The profiles may be compared with other profiles in a context database based on the metrics included in each profile and each other profile. In response to the profiles being unmatched by other profiles one or more active probes may be performed to collect other metrics that may be used to update profiles. In response to the one or more profiles being matched by the other profiles in the context database, a timestamp associated with the other profiles may be updated to a current time value. Reports that include information associated with the entities and the profiles or the updated profiles may be generated.

24 Claims, 11 Drawing Sheets

(56) References Cited

U.S. PATENT DOCUMENTS

| | | |
|---|---|---|
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,352,725 B1 | 1/2013 | O'Toole, Jr. |
| 8,411,677 B1 | 4/2013 | Colloff |
| 8,418,249 B1 | 4/2013 | Nucci et al. |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marshall et al. |
| 8,578,024 B1 | 11/2013 | Keralapura et al. |
| 8,619,579 B1 | 12/2013 | Rothstein et al. |
| 8,627,422 B2 | 1/2014 | Hawkes et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,049,216 B2 | 6/2015 | McCanne et al. |
| 9,083,740 B1 | 7/2015 | Ma et al. |
| 9,094,288 B1 | 7/2015 | Nucci et al. |
| 9,158,604 B1 | 10/2015 | Christodorescu et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |
| 9,264,288 B1 | 2/2016 | Arora et al. |
| 9,338,147 B1 | 5/2016 | Rothstein et al. |
| 9,357,410 B2 | 5/2016 | Nedeltchev et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,591,015 B1 | 3/2017 | Amin et al. |
| 9,621,523 B2 | 4/2017 | Rothstein et al. |
| 9,660,879 B1 | 5/2017 | Rothstein et al. |
| 9,692,658 B2 | 6/2017 | Guo et al. |
| 9,715,820 B1 | 7/2017 | Boss et al. |
| 9,729,416 B1 | 8/2017 | Khanal et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,038,611 B1 * | 7/2018 | Wu ............ H04L 41/06 |
| 10,063,434 B1 | 8/2018 | Khanal et al. |
| 10,198,667 B2 | 2/2019 | Ryan, Jr. et al. |
| 10,237,294 B1 * | 3/2019 | Zadeh ............ H04L 63/1425 |
| 10,263,883 B2 | 4/2019 | Kamble |
| 10,264,003 B1 | 4/2019 | Wu et al. |
| 10,277,618 B1 | 4/2019 | Wu et al. |
| 10,320,749 B2 | 6/2019 | Sengupta et al. |
| 10,321,344 B2 | 6/2019 | Barton et al. |
| 10,332,005 B1 | 6/2019 | Liao et al. |
| 10,348,767 B1 | 7/2019 | Lee et al. |
| 10,375,155 B1 | 8/2019 | Cai et al. |
| 10,389,574 B1 | 8/2019 | Wu et al. |
| 10,411,978 B1 * | 9/2019 | Ball ............ H04L 43/062 |
| 10,536,475 B1 | 1/2020 | McCorkle, Jr. et al. |
| 10,554,665 B1 | 2/2020 | Badawy et al. |
| 10,594,718 B1 | 3/2020 | Deaguero et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |

(56) References Cited

U.S. PATENT DOCUMENTS

| | | |
|---|---|---|
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1* | 11/2002 | Hand ............... H04L 43/06 715/734 |
| 2002/0199098 A1 | 12/2002 | Davis |
| 2003/0014628 A1 | 1/2003 | Freed et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130659 A1 | 6/2008 | Polland |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0126259 A1 | 5/2011 | Krishnamurthi et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |

(56) References Cited

U.S. PATENT DOCUMENTS

| | | |
|---|---|---|
| 2012/0030731 A1 | 2/2012 | Bhargava et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0278477 A1 | 11/2012 | Terrell et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschênes et al. |
| 2013/0305357 A1 | 11/2013 | Ayyagari et al. |
| 2013/0339514 A1 | 12/2013 | Crank et al. |
| 2013/0347018 A1 | 12/2013 | Limp et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0222998 A1 | 8/2014 | Vasseur et al. |
| 2014/0223325 A1 | 8/2014 | Melendez et al. |
| 2014/0242972 A1 | 8/2014 | Slotznick |
| 2014/0258511 A1 | 9/2014 | Sima et al. |
| 2014/0269777 A1 | 9/2014 | Rothstein et al. |
| 2014/0304211 A1 | 10/2014 | Horvitz |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0023168 A1 | 1/2015 | Kotecha et al. |
| 2015/0026027 A1 | 1/2015 | Priess et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0100780 A1 | 4/2015 | Rubin et al. |
| 2015/0106930 A1 | 4/2015 | Honda et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0093205 A1 | 3/2016 | Boyer |
| 2016/0119215 A1 | 4/2016 | Deschênes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0373414 A1 | 12/2016 | MacCarthaigh |
| 2016/0380885 A1 | 12/2016 | Jani et al. |
| 2017/0048109 A1 | 2/2017 | Kant et al. |
| 2017/0076206 A1 | 3/2017 | Lastras-Montano et al. |
| 2017/0085590 A1 | 3/2017 | Hsu et al. |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289847 A1 | 10/2017 | Wetterwald et al. |
| 2017/0310703 A1 | 10/2017 | Ackerman et al. |
| 2017/0353437 A1 | 12/2017 | Ayyadevara et al. |
| 2017/0353477 A1 | 12/2017 | Faigon et al. |
| 2017/0366526 A1 | 12/2017 | Wood et al. |
| 2018/0013650 A1 | 1/2018 | Khanal et al. |
| 2018/0084011 A1 | 3/2018 | Joseph et al. |
| 2018/0091413 A1 | 3/2018 | Richards et al. |
| 2018/0109507 A1 | 4/2018 | Caldera et al. |
| 2018/0109557 A1 | 4/2018 | Yoo et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1* | 8/2018 | Pierce ............... H04L 41/142 |
| 2018/0260715 A1 | 9/2018 | Yan et al. |

(56) References Cited

U.S. PATENT DOCUMENTS

| | | | |
|---|---|---|---|
| 2018/0276561 A1 | 9/2018 | Pasternack et al. | |
| 2018/0351781 A1 | 12/2018 | Movsisyan et al. | |
| 2018/0351970 A1 | 12/2018 | Majumder et al. | |
| 2018/0375893 A1 | 12/2018 | Jordan et al. | |
| 2019/0007283 A1 | 1/2019 | Kieviet et al. | |
| 2019/0012441 A1 | 1/2019 | Tuli et al. | |
| 2019/0028357 A1 | 1/2019 | Kokkula et al. | |
| 2019/0052554 A1* | 2/2019 | Mukerji | H04L 43/04 |
| 2019/0052675 A1 | 2/2019 | Krebs | |
| 2019/0095478 A1* | 3/2019 | Tankersley | G06F 16/2379 |
| 2019/0102469 A1 | 4/2019 | Makovsky et al. | |
| 2019/0121979 A1 | 4/2019 | Chari et al. | |
| 2019/0132359 A1 | 5/2019 | Kraenzel et al. | |
| 2019/0163678 A1* | 5/2019 | Bath | G06F 16/22 |
| 2019/0171725 A1 | 6/2019 | Shen et al. | |
| 2019/0196912 A1 | 6/2019 | Didehban et al. | |
| 2019/0236149 A1* | 8/2019 | Kuruvada | G06Q 10/063 |
| 2019/0245734 A1 | 8/2019 | Wu et al. | |
| 2019/0245763 A1 | 8/2019 | Wu et al. | |
| 2019/0266999 A1 | 8/2019 | Chandrasekaran et al. | |
| 2019/0303198 A1 | 10/2019 | Kim et al. | |
| 2019/0372828 A1 | 12/2019 | Wu et al. | |
| 2020/0067952 A1 | 2/2020 | Deaguero et al. | |

FOREIGN PATENT DOCUMENTS

| | | |
|---|---|---|
| EP | 3089424 A1 | 11/2016 |
| EP | 3113443 A1 | 1/2017 |
| KR | 20140093060 A | 7/2014 |
| WO | 2009015461 A1 | 2/2009 |
| WO | 2016118131 A1 | 7/2016 |
| WO | 2016144932 A1 | 9/2016 |

OTHER PUBLICATIONS

Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.
Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Office Communication for U.S. Appl. No. 14/500,893 dated Nov. 20, 2014, pp. 1-15.
Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-End Protocol Semantics," 2011. International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS 3.6-2011. 2011, http://dicom.nema.org/Dicom/2011 /11_06pu.pdf, pp. 1-216.
Health Level Seven, Version 2.6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/891,273 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.

(56) References Cited

OTHER PUBLICATIONS

Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,690 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key_Log_Format, Jan. 8, 2010, p. 1.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet Inspection Method," Masaryk University. Faculty of Informatics, Master's Thesis, 2014, pp. 1-74.
International Search Report and Written Opinion for International Patent Application No. PCT/US2017/068586 dated Aug. 9, 2018, pp. 1-14.

(56) References Cited

OTHER PUBLICATIONS

Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.
Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,837 dated Jan. 22, 2020, pp. 1-28.
Office Communication for U.S. Appl. No. 16/384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.
Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Wade, Susan Marie, ""SCADA Honeynets: The attractiveness of honeypots as critical infrastructure security tools for the detection and analysis of advanced threats"" (2011). Graduate Theses and Dissertations. 12138. https://lib.dr.iastate.edu/etd/12138, pp. 1-67.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 16/820,582 dated Sep. 27, 2021, pp. 1-25.

* cited by examiner

COMBINING PASSIVE NETWORK ANALYSIS AND ACTIVE PROBING

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

Networks of organizations often are attacked by malicious actors from external or internal locations. Vigilant organizations employ a variety of defenses or security mechanisms to help ensure the safety or integrity of their networks or the data stored on networked devices or computers.

However, networking protocols or security protocols increasingly include encryption or other security measures to obscure network traffic between endpoints. Accordingly, in some cases, conventional passive network monitoring may provide less utility because the obscured network traffic may reduce the amount of useful information that may be available to passive network monitors. In some cases, active network probing may enable additional information to be discovered from otherwise obscured network traffic. However, in some cases, continuous or broadly targeted active probing may impact services in monitored networks or otherwise impact the performance of the monitored networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
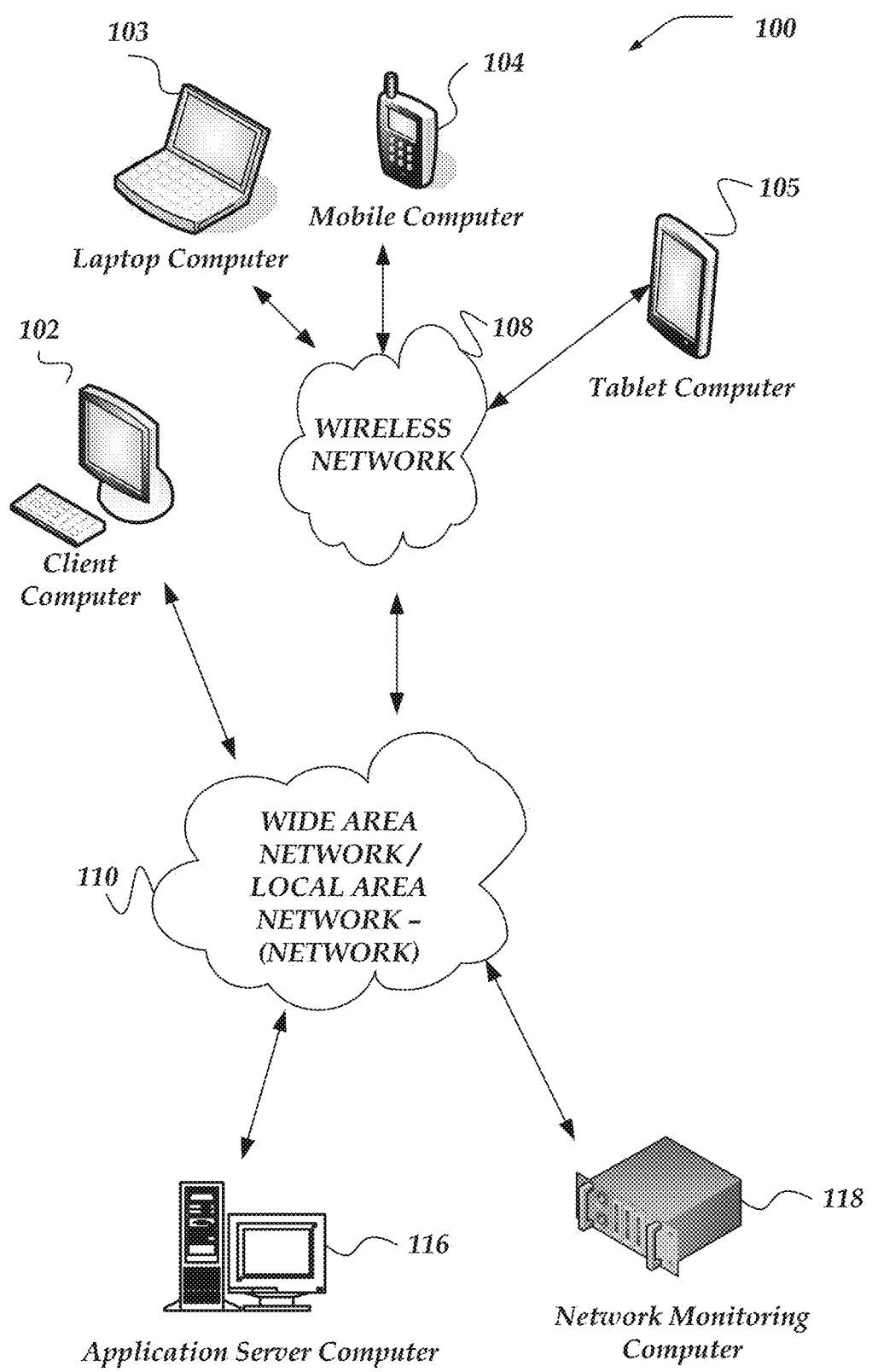
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, Rust, Java™, Go, Swift, Python, R, Julia, JavaScript, Ruby, Nim, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocol, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, TLS, QUIC, SSH, Wireguard, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end-to-end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "control traffic" refers to the portion of network traffic that may be associated with control information that may be employed to execute a network communication protocol. Control information may vary depending on the protocols being used or monitored. Typically, control information may include information exchanged between clients and servers to administer or facilitate the operation of network communication protocols, such as, connection initialization, connection termination, resetting connections, status information, sharing secrets, negotiating cipher suites, negotiating transmission characteristics, authentication, acknowledgments, or the like. Generally, control traffic may be required to be exchanged between clients and servers to enable a given protocol to operate or operate efficiently.

As used herein, the term, "data traffic" refers to the portion of network traffic that may be associated with data sent between clients and servers using a given network communication protocol. The data may be information that is carried in a so-called payload portion of a protocol. Data traffic may be considered to be unrelated to the operation or administration of the protocol it used to carry it between endpoints.

As used herein, the terms, "data traffic policy," or "data policy" as used herein refer to network security policy that defines rules or restrictions associated with how particular data traffic may be communicated in a network. Data traffic policies may define rules associated with the direction data traffic may flow for various endpoints, network segments, networks, applications, users, or the like. As described in more detail below, different portions of a network or different entities may be associated with different data traffic policies. Likewise, different protocols may be associated with different data traffic policies.

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the terms "active probe," or "active probing" refer to one or more actions performed or initiated by an NMC designed to elicit one or more responses from one or more entities. As an example of a scenario where an active probe is useful, consider a passively observed TLS 1.3 connection. In this scenario, the server cert presented is encrypted and unavailable to the observer. An active probe that sends a TLS ClientHello that is sufficiently similar to the original client's will elicit the same certificate from the server. More generally, it may be hard or impossible to gather evidence of what software a server is running without active probes, if all communication to that server is encrypted. For example, consider a malicious command & control (C2) server that only uses encrypted communication. From an observer's perspective, the traffic may look out of the ordinary due to the unusual destination, the traffic volume, or the traffic pattern, or the like, but a confident determination of the nature of the server's software may not be possible without additional measures taken. By performing an active probe that is designed to gather more information about the server's software, including potentially eliciting a response only made by that C2 server, would help make a determination on whether the communication was malicious or not. The same point can be made about benign software that communicates primarily or entirely over encrypted traffic: a determination on the software in use may be hard or impossible from an observer's perspective, but by performing an active probe more evidence can be gathered on what software the server is running. The NMC can either perform the active probing itself, or coordinate with another device or service to perform active probing based on instructions from the NMC.

As used herein, the term, "configuration information" refers to information that may include rule-based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In one or more of the various embodiments, one or more metrics may be determined based on monitoring network traffic associated with one or more entities in the network such that the one or more metrics may be included in one or more profiles and such that each entity may be associated with a profile based on the network traffic.

In one or more of the various embodiments, the one or more profiles may be compared with one or more other profiles in a context database based on the one or more metrics included in each profile and each other profile.

In some embodiments, in response to the one or more profiles being unmatched by one or more other profiles, further actions may be performed, including: determining one or more active probes to include in one or more jobs based on the one or more profiles; executing the one or more jobs to collect one or more other metrics that are generated by the one or more active probes; updating the one or more profiles based on the one or more other metrics; storing the one or more updated profiles in the context database; or the like. In some embodiments, in response to the one or more profiles being matched by the one or more other profiles in the context database, a timestamp associated with the one or more other profiles may be updated to a current time value.

In one or more of the various embodiments, one or more reports that include information associated with the one or more entities and the one or more profiles or the one or more updated profiles may be generated.

In one or more of the various embodiments, executing the one or more jobs to collect the one or more other metrics may include: determining a portion of the network traffic that may be associated with a protocol handshake directed to an entity in the monitored network; collecting one or more observable metrics from the portion of network traffic associated with the protocol handshake such that the one or more observable metrics may be included in a profile corresponding to the entity; And, in response to the profile being unmatched by another profile in the context database, further actions may be performed, including: providing one or more messages that mimic one or more portions of the protocol handshake to the entity; determining a portion of the one or more other metrics based on one or more responses to the one or more messages; updating the profile based on the portion of the one or more other metrics; or the like.

In one or more of the various embodiments, determining the one or more active probes to include in the one or more jobs may include, excluding a portion of the one or more entities from the one or more active probes based on one or more of an application type, a communication protocol, a target entity, a source entity, a traffic shape, a range of source network addresses, a range of target network addresses, a payload/packet size associated with the one or more excluded entities, or the like.

In one or more of the various embodiments, executing the one or more jobs to collect the one or more other metrics may include querying one or more of a service directory, a user directory, a configuration service, a system database, wherein the profile may be updated based on one or more responses to the query, or the like.

In one or more of the various embodiments, executing the one or more jobs to collect the one or more other metrics may include: generating one or more network packets that include one or more of a network address, a port, other tuple information, a host name, a user name, a security credential, or the like. In one or more of the various embodiments, the one or more network packets may be communicated to a portion of the one or more entities associated with the one or more unmatched profiles. In some embodiments, a portion of the network traffic associated with the one or more network packets may be monitored to determine a portion of the one or more other metrics. And, in some embodiments, the profile may be updated based on the portion of the one or more other metrics.

In one or more of the various embodiments, the one or more jobs may be added to a queue. And, in some embodiments, the one or more jobs may be executed in turn based on the queue.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
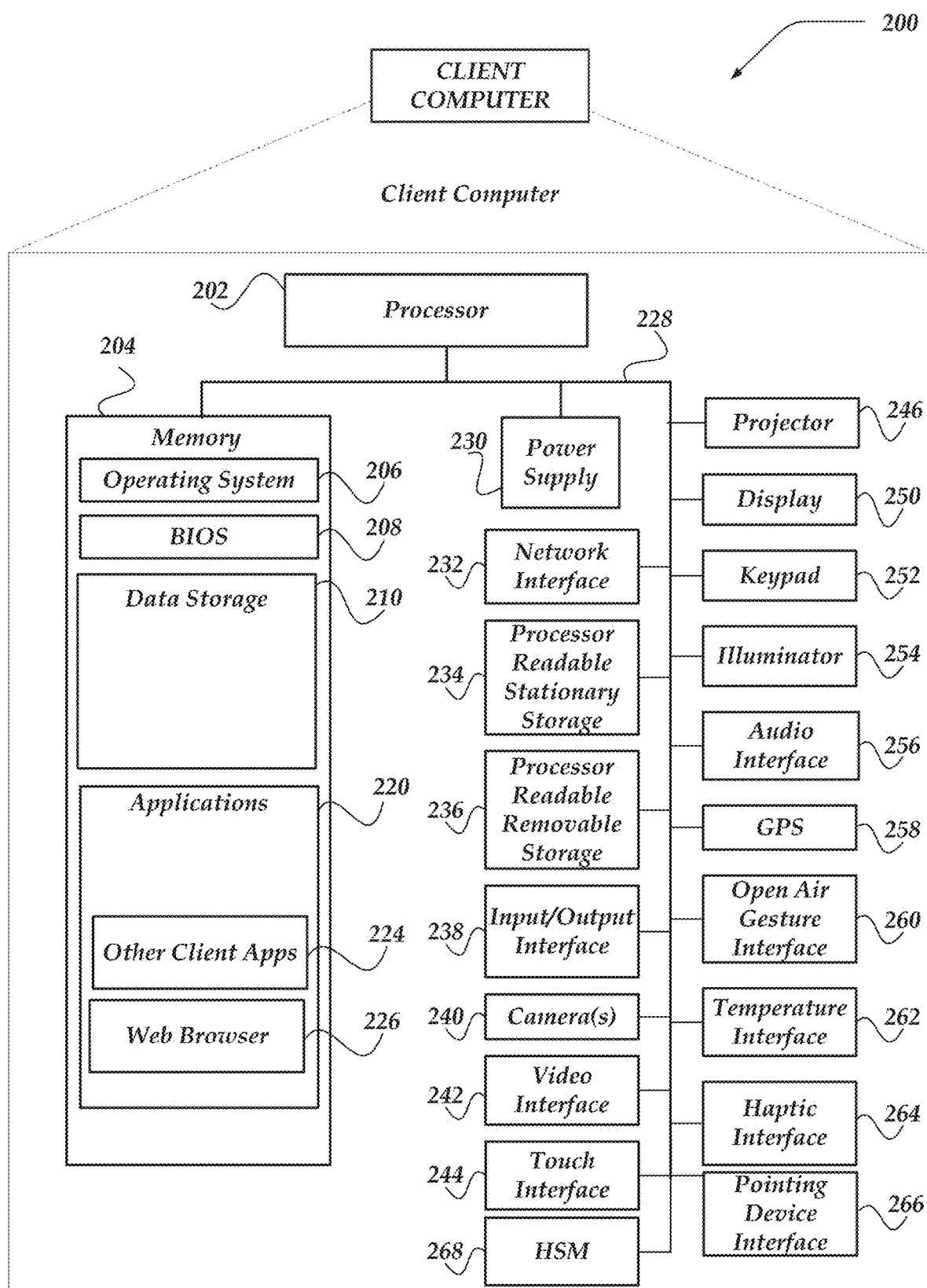
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
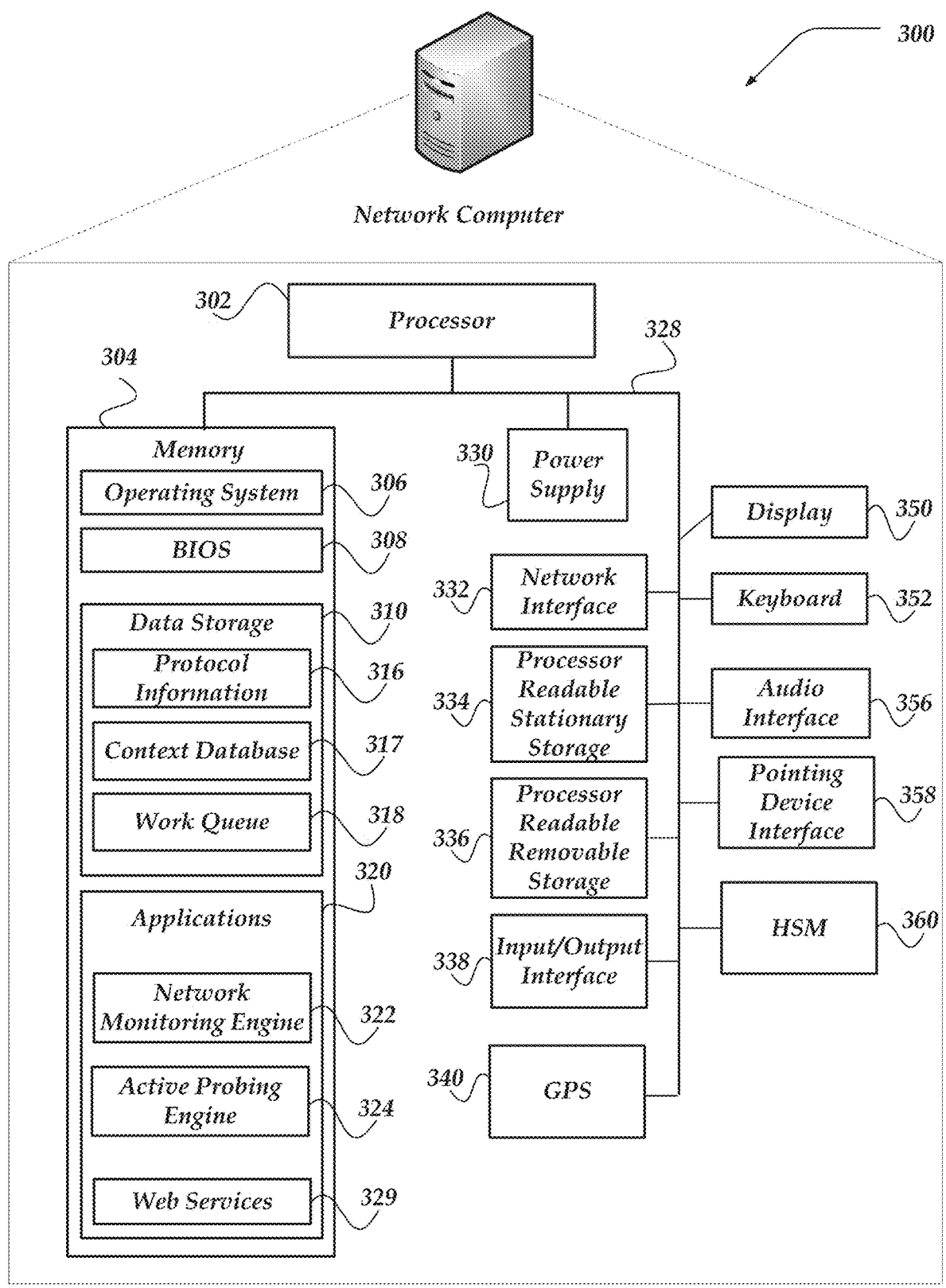
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, active probing engine 324, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple® Corporation's macOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, protocol information 316, context database 317, probe queue 318, or the like. In some embodiments, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detection, activity determination, active probing, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, active probing engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, active probing engine 324, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, active probing engine 324, web services 329, or the like, may be provisioned and de-commissioned automatically.

Also, in one or more of the various embodiments, network monitoring engine 322, active probing engine 324, web services 329, or the like, may be located in virtual servers running in a cloud-based computing environment rather than being tied to one or more specific physical network computers. Likewise, in some embodiments, one or more of network monitoring engine 322, active probing engine 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of or along-side CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
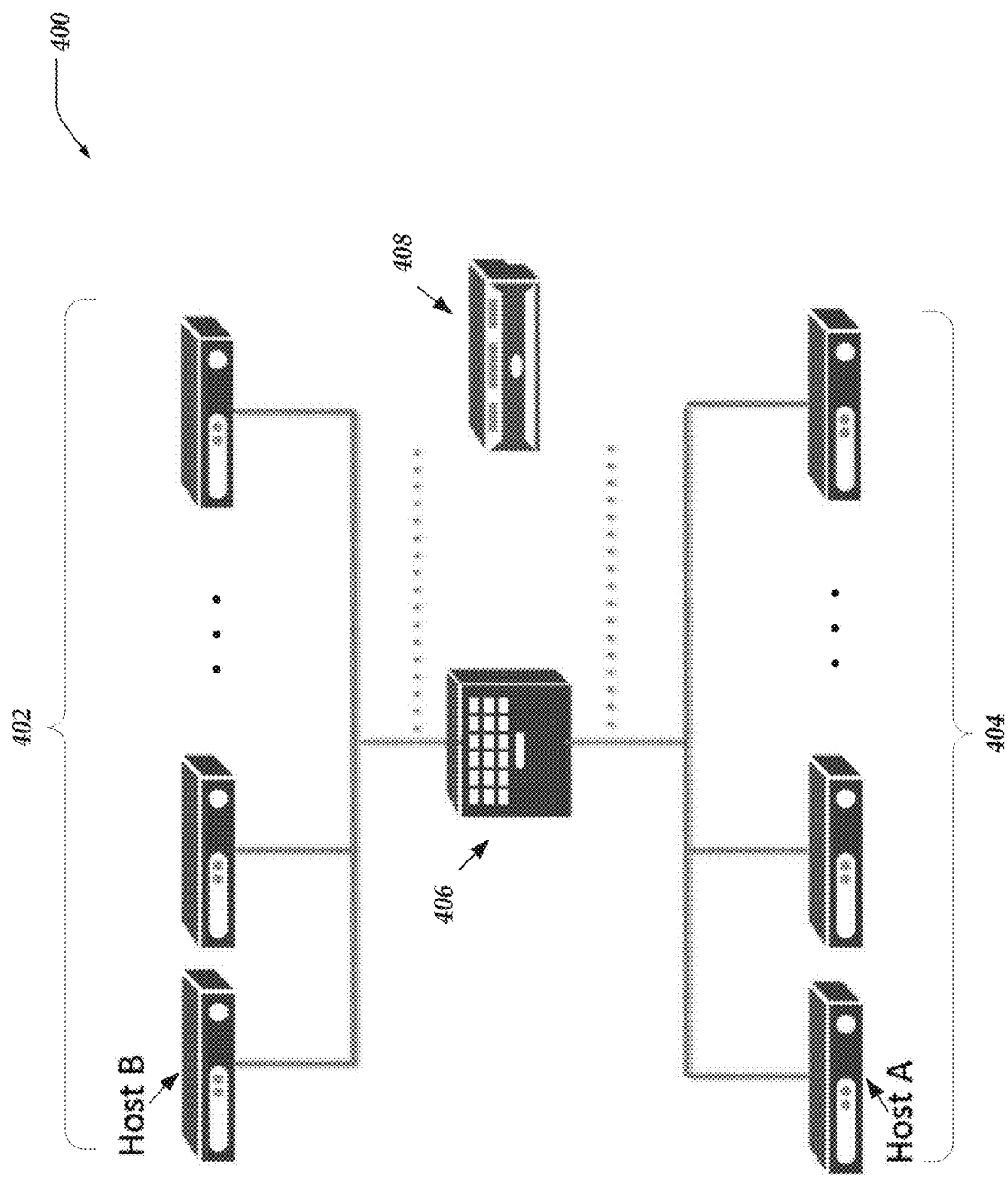
FIG. 4 illustrates a logical architecture of a system for combining passive network analysis and active probing in accordance with one or more of the various embodiments.

FIG. 4 illustrates a logical architecture of system 400 for combining passive network analysis and active probing in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

Figure 5:
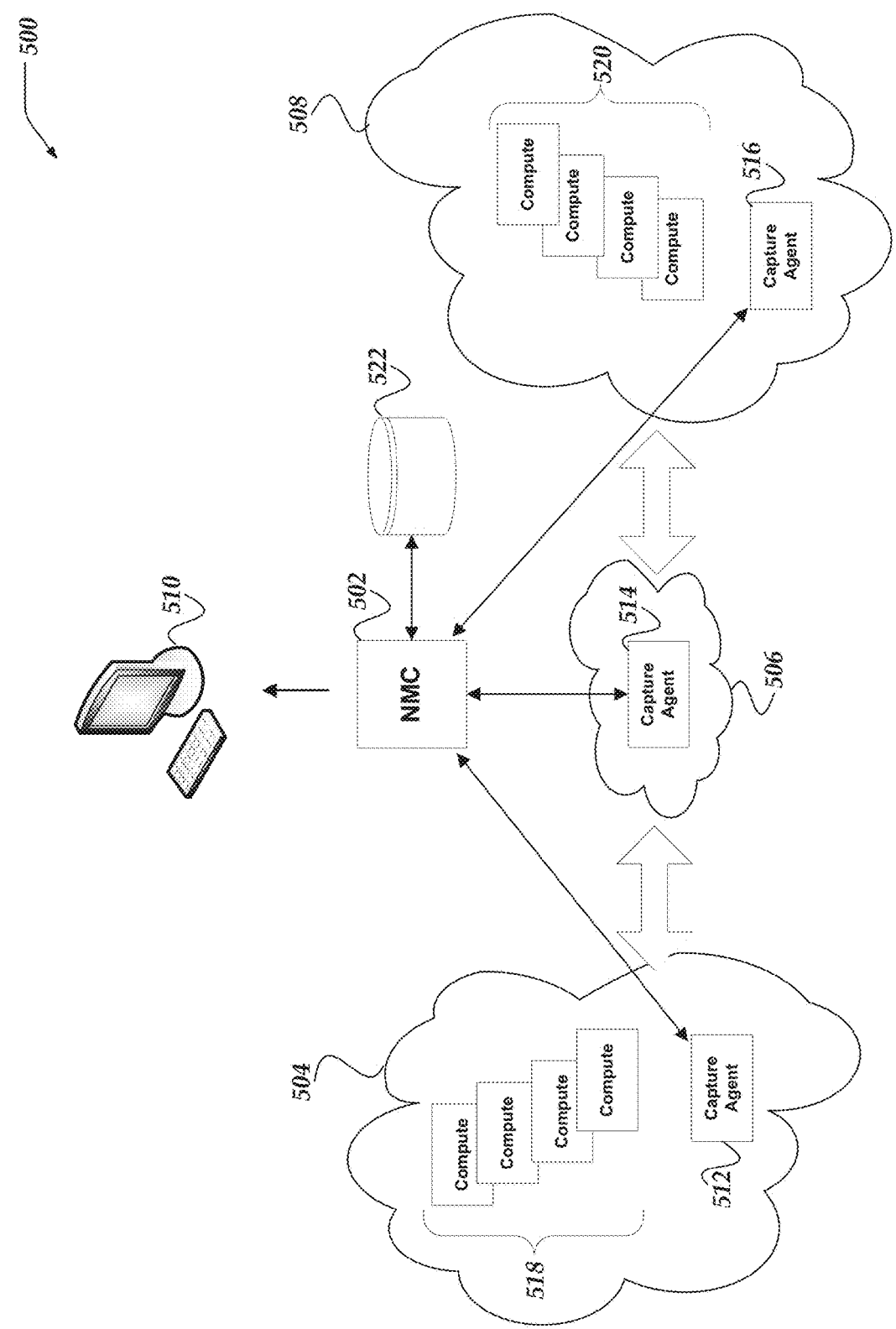
FIG. 5 illustrates a logical schematic of a system for identifying network entities based on beaconing activity in accordance with one or more of the various embodiments.

FIG. 5 illustrates a logical schematic of system 500 for identifying network entities based on beaconing activity in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be arranged to capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Figure 6:
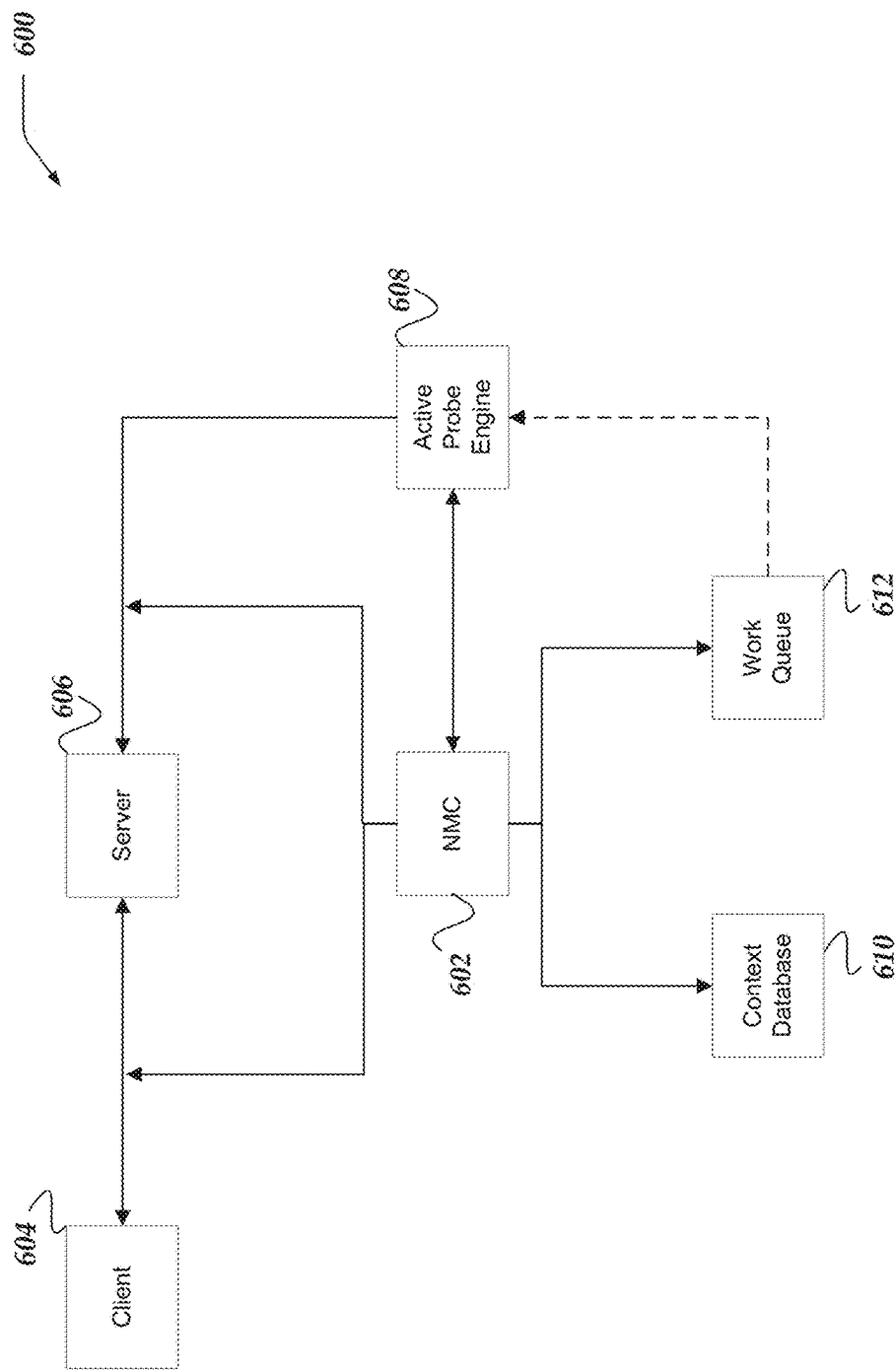
FIG. 6 illustrates a logical schematic of a system for combining passive network analysis and active probing in accordance with one or more of the various embodiments.

FIG. 6 illustrates a logical schematic of system 600 for combining passive network analysis and active probing in accordance with one or more of the various embodiments. In one or more of the various embodiments, system 600 may represent a networking environment that may include: one or more network monitoring computers (NMCs), such as, NMC 602; one or more clients, such as, client 604; one or more servers, such as, server 606; one or more active probe engines, such as, active probe engine 608; one or more data stores, such as, context database 610; one or more work queues, such as, work queue 612; or the like.

In one or more of the various embodiments, NMC 602 may be a NMC configured to monitor network traffic that may be associated with one or more clients or one or more servers. Accordingly, in some embodiments, NMC 602 may be arranged to passively monitor network traffic exchanged between client 604 and server 606. Note, one of ordinary skill in the art will appreciate that in some embodiments, clients or servers may change roles depending on circumstances. Accordingly, client 604 may be considered to represent a service, computer, process, network device, or the like, acting in the role of a client relative to another service, computer process network device, or the like, operating in the role of a server. In other circumstances, client 604 may operate as a server or server 606 may operate as a client.

In one or more of the various embodiments, active probe engines, such as, active probe engine 608 may be arranged to provide or execute one or more active probes that may be employed to investigate or interrogate one or more endpoints or entities that may be communicating in the monitor networks. In some embodiments, active probe engines may be arranged to execute one or more actions for actively determining one or more metrics about clients, servers, or network traffic exchanged between them. In some embodiments, active probe engines may be arranged to operate on behalf of or as part of network monitoring engines or NMCs.

In one or more of the various embodiments, context database 610 may be arranged to be data store for caching learned or discovered information related to monitored communication or collected metrics. In some embodiments, NMCs may be arranged to generate activity profiles for storing metrics or other features associated with activity in the monitored networks. Accordingly, in some embodiments, context caches may be arranged to store activity profile information that enables NMCs to compare or evaluate activity profiles.

In one or more of the various embodiments, NMCs may be arranged to compare newly generated activity profiles with previously collected activity profiles stored in context database 610.

Also, in some embodiments, work queues may be arranged to queue one or more active probe requests or active probe jobs. Accordingly, in some embodiments, an active probe engine may be arranged to execute queued probe jobs and provide resulting metrics (if any) to the NMCs for further processing.

In some embodiments, network monitoring computers (NMCs) may be arranged to passively monitor network traffic in one or more monitored networks. In some embodiments, NMCs may be arranged to identify network activity that may include one or more obscured features that are invisible or indistinguishable from the observable network traffic because of encryption, or the like.

In one or more of the various embodiments, NMCs may be arranged to determine interesting activity based on passively observing one or more features/metrics that may be correlated with the interesting activity. However, in some embodiments, if the network traffic associated with the interesting network activity may be opaque or obscured because of security protocols, NMCs may be disabled from further analysis of the network traffic. Accordingly, in some embodiments, the utility of passive monitoring may be reduced because the contents of network packet headers or network packet payloads associated with the interesting activity may be obscured from the NMCs.

Conventionally, an organization may attempt to work around the limitations introduced by obscured network traffic by employing various active probing measures. However, continuously or broadly applied active probing measures may be disadvantageous for various reasons, including, unwanted/unexpected side-effects, performance impacts on endpoint services/devices, performance impacts on the monitored networks, privacy concerns, or the like.

Accordingly, in some embodiments, NMCs may be arranged to selectively execute or initiate active probing measures that are narrowly targeted to particular network activity that may be identified based on passive monitoring.

In some embodiments, NMCs may be arranged to employ activity profiles that define one or more characteristics (e.g., metrics) that may be passively observed. In some embodiments, activity profiles may be identified or classified based on patterns, conditions, or rules for determining if a particular activity of interest has or is occurring in the monitored networks based on network traffic features that may be observed passively.

Further, in some embodiments, NMCs may be arranged to employ active probe profiles that declare one or more services, rules, instructions, parameters, or the like, that may be employed as active probing measures.

Thus, in some embodiments, NMCs may be arranged to associate activity profiles with probe profiles enabling activity determined by passive monitoring to be associated with narrowly targeted active probe measures that may be tailored for specific or limited purposes.

Also, in one or more of the various embodiments, NMCs may be arranged to maintain a context database that provides a database for storing records associated with interesting network activity, sessions, flows, network traffic, and so on, that match activity profiles. In some embodiments, NMCs may be arranged to employ the context database to track activity profile information associated with previously observed network activity.

Accordingly, in some cases, for some embodiments, NMCs may be arranged to further reduce the amount of active probing by checking the context database to determine if the activity has already been actively probed. For example, if a session is determined to involve interesting activity (as defined by matching one or more activity profiles), NMCs may refer to the context database before initiating active probing measures. And, if the context database shows that a previous probe determined the activity of interest to be safe, the NMC may avoid probing it again. Note, in some embodiments, records in the context database may be associated with timeouts such that upon expiry those records may be expunged or otherwise deemed stale.

Further, in some embodiments, as interesting activity may be observed, NMCs may be arranged to enter work records associated the interesting activity into a work queue. Accordingly, in some embodiments, another service, such as, an active probe engine may be arranged to retrieve records from the work queue to determine the activities or entities in the monitored network that may require active probing. In some cases, active probe engines may operate at real-time or near real-time such that they attempt to conduct active probing measures soon after the interesting activity is observed. Alternatively, in some embodiments, active probe engine may be arranged to operate more or less offline or out-of-band with respect to the interesting activity.

In some embodiments, depending on the results of active probing NMCs may generate one or more notifications, reports, or the like, enabling responsive actions to be performed.

Figure 7:
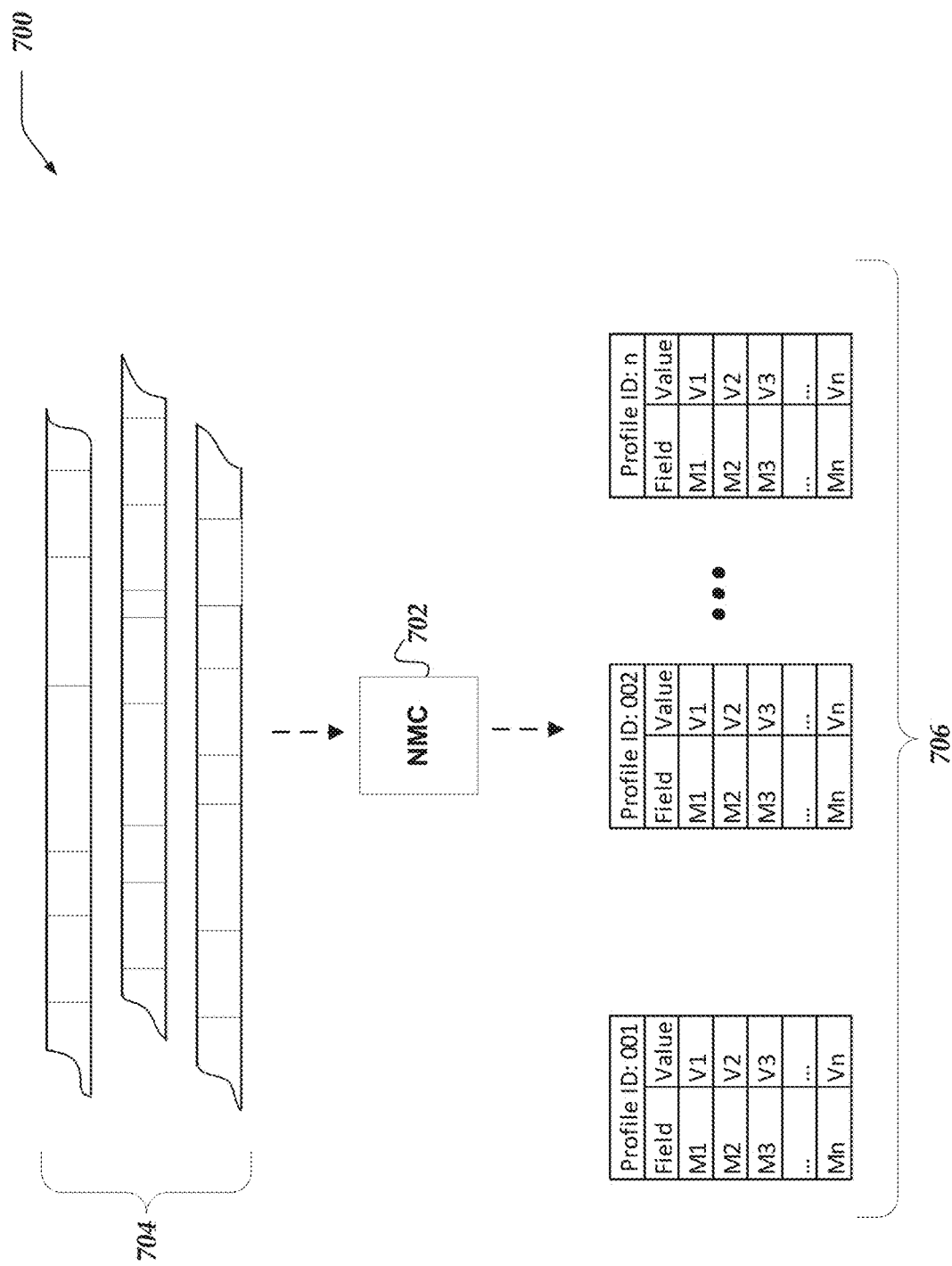
FIG. 7 represents a logical representation of a system for transforming monitored network traffic into activity profile objects in accordance with one or more of the various embodiments.

FIG. 7 represents a logical representation of system 700 for transforming monitored network traffic into activity profile objects in accordance with one or more of the various embodiments. In one or more of the various embodiments, NMC 702 may be arranged to passively monitor network traffic 704. As described, in some embodiments, NMC 702 may be arranged to provide various metrics associated with monitored network traffic 704. In some cases, network traffic 704 may include one or more metrics determine from active probing one or more entities in the monitored networks.

In one or more of the various embodiments, an NMC may be arranged to transform one or more collected metrics into activity profile objects suitable for evaluating entities in the monitored networks.

Accordingly, in one or more of the various embodiments, as described above, NMCs such as, NMC 702 may be arranged to collect metrics from monitored network traffic and arrange them into activity profiles. In one or more of the various embodiments, activity profile objects, such as, activity profile 706 may include one or more collections of fields with values that may be based on network traffic 704. In one or more of the various embodiments, one or more of the metrics included in a profile object may correspond to metrics collected by the NMC or via active probing. In other embodiments, one or more of the metrics included in an activity profile object may be composites based on two or more metrics.

Further, in one or more of the various embodiments, metric values included in activity profile objects may be normalized to a common schema as well as arithmetically normalized. Normalizing metric values to a common schema may include bucketing values. For example, in some embodiments, observed metrics that have continuous values may be mapped to named buckets, such as high, medium, low, or the like. Likewise, one or more metrics may be categorized using one or more rules or heuristics.

Accordingly, in some embodiments, NMCs may be arranged to employ activity profile objects to represent different activity that may be discovered or observed in monitored networks. Thus, in some embodiments, NMCs may be arranged to include one or more metrics collected by active probing in activity profile objects to provide additional signals or characteristics that may be employed to infer information about the corresponding entities in the monitored network.

Generalized Operations

FIGS. 8-12 represent generalized operations for combining passive network analysis and active probing in accordance with one or more of the various embodiments. In one or more of the various embodiments, processes 800, 900, 1000, 1100, and 1200 described in conjunction with FIGS. 8-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 8-12 may be used for combining passive network analysis and active probing in accordance with at least one of the various embodiments or architectures such as those described in conjunction with FIGS. 4-7. Further, in one or more of the various embodiments, some or all of the actions performed by processes 800, 900, 1000, 1100, and 1200 may be executed in part by network monitoring engine 322, active probing engine 324, or the like, running on one or more processors of one or more network computers.

Figure 8:
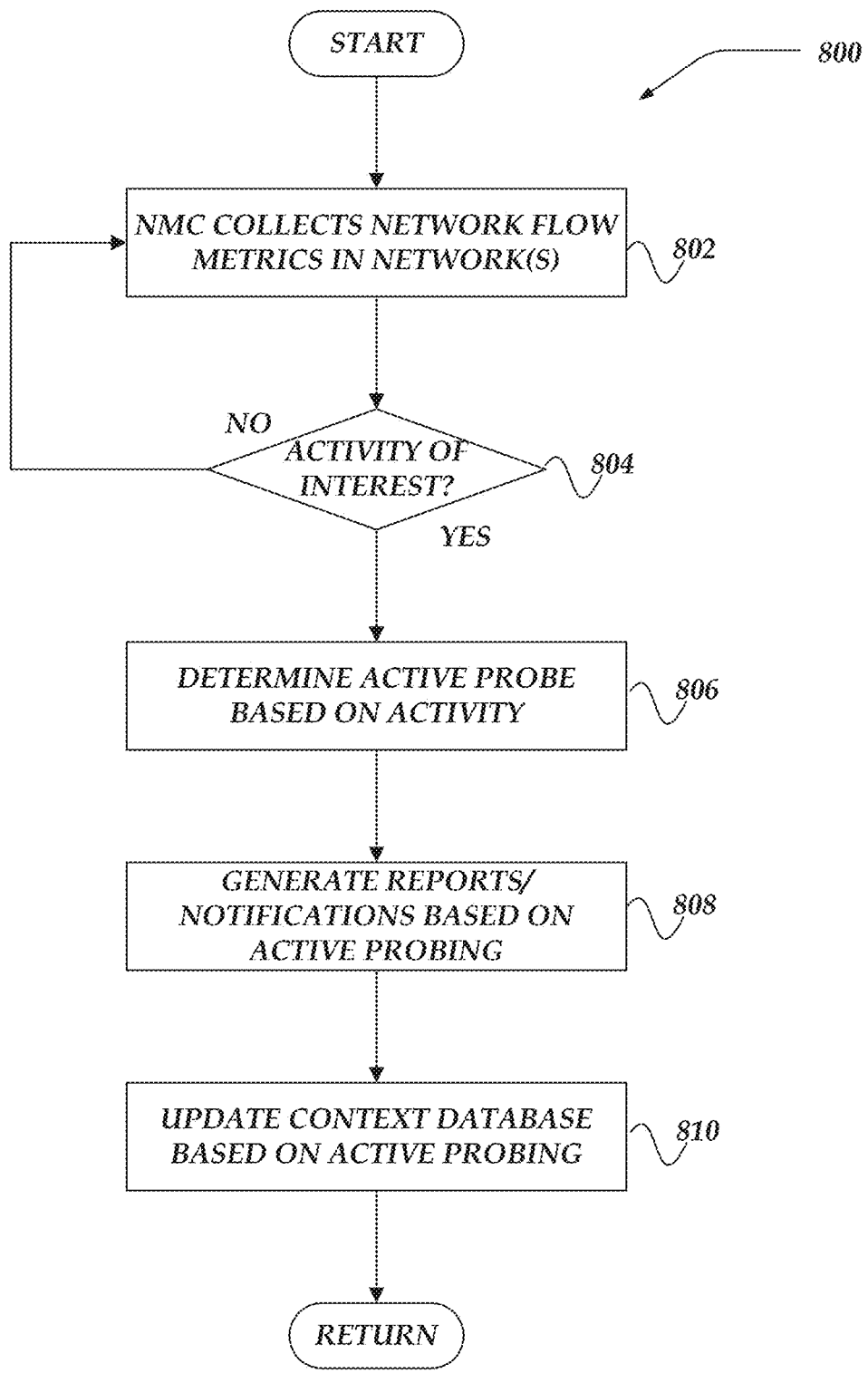
FIG. 8 illustrates an overview flowchart of a process for combining passive network analysis and active probing in accordance with one or more of the various embodiments.

FIG. 8 illustrates an overview flowchart of process 800 for combining passive network analysis and active probing in accordance with one or more of the various embodiments. After a start block, at block 802, in one or more of the various embodiments, NMCs may be arranged to monitor network traffic associated with one or more endpoints in one or more networks. As described above, NMCs may be arranged to monitor network traffic in a network environment. Accordingly, in some embodiments, NMCs may collect a variety of metrics associated with the one or more flows that comprise network traffic in monitored networks. Further, in some embodiments, NMCs may be arranged to analyze patterns, features, contents, or the like, of network traffic associated with one or more network flows. In some embodiments, NMCs may be arranged to track requests/responses between endpoints to determine the protocols that may be in use or evaluate if the network traffic matches expectation or policies that may be associated protocols. Note, as mentioned above protocols detected or monitored by NMCs may be one or more of data-link layer protocols, transport protocols, application protocols, or the like. Accordingly, for brevity or clarity they may be referred to herein as protocols.

In some embodiments, NMCs may be arranged to identify one or more patterns, protocols, traffic features, or the like, that may be associated with beaconing behavior of one or more entities in the monitored network.

At decision block 804, in one or more of the various embodiments, if the monitored network traffic or one or more associated endpoints may be associated with an activity of interest, control may flow block 806; otherwise, control may loop back to block 802.

In one or more of the various embodiments, activity of interest may be classified into general categories based on protocols, ports, traffic shape, source, target, or the like. Accordingly, in some embodiments, NMCs may be arranged to employ one or more rules, models, instructions, or the like, provided via configuration information to evaluate network traffic to determine if the network traffic may be associated with activity that may be interest.

At block 806, in one or more of the various embodiments, NMCs may be arranged to determine one or more active probe measures based on the activity of interest.

At block 808, in one or more of the various embodiments, NMCs may be arranged to generate one or more reports/notifications based on the active probing. In some embodiments, NMCs may be arranged to include metrics or information determined from active probing in one or more reports, including, dashboard user interfaces, visualizations, documents, log files, event streams, or the like. In some embodiments, reports may include writing records (e.g., events, notifications, log records, or the like) into databases or other data stores. Accordingly, in some embodiments, other services or applications may be provided the reported information. Thus, in some embodiments, the other services or applications may be configured to take further action in response to the reported activity. For example, in some embodiments, the reports may include information based on characterizing one or more entities based on the activity.

At block 810, in one or more of the various embodiments, NMCs may be arranged to update context databases based on active probing.

As described above, in some embodiments, context databases may be data stores (e.g., databases, in-memory key value stores, caches, or the like) used for storing information or metrics associated with network flows, network connections, or entities observed in monitored networks.

In one or more of the various embodiments, NMC may be arranged to index context databases using information or metrics that may be obtained via passive monitoring, such as, tuple information, or the like.

As described above, in some embodiments, activity profiles may be initially populated with information or metrics determined from passive monitoring. Accordingly, in some embodiments, activity profiles may be stored in context databases. Thus, in some embodiments, if activity probing occurs, related activity profiles may be updated to include information or metrics determined via the active probing.

Next, in one or more of the various embodiments, control may be returned to a calling process.

Figure 9:
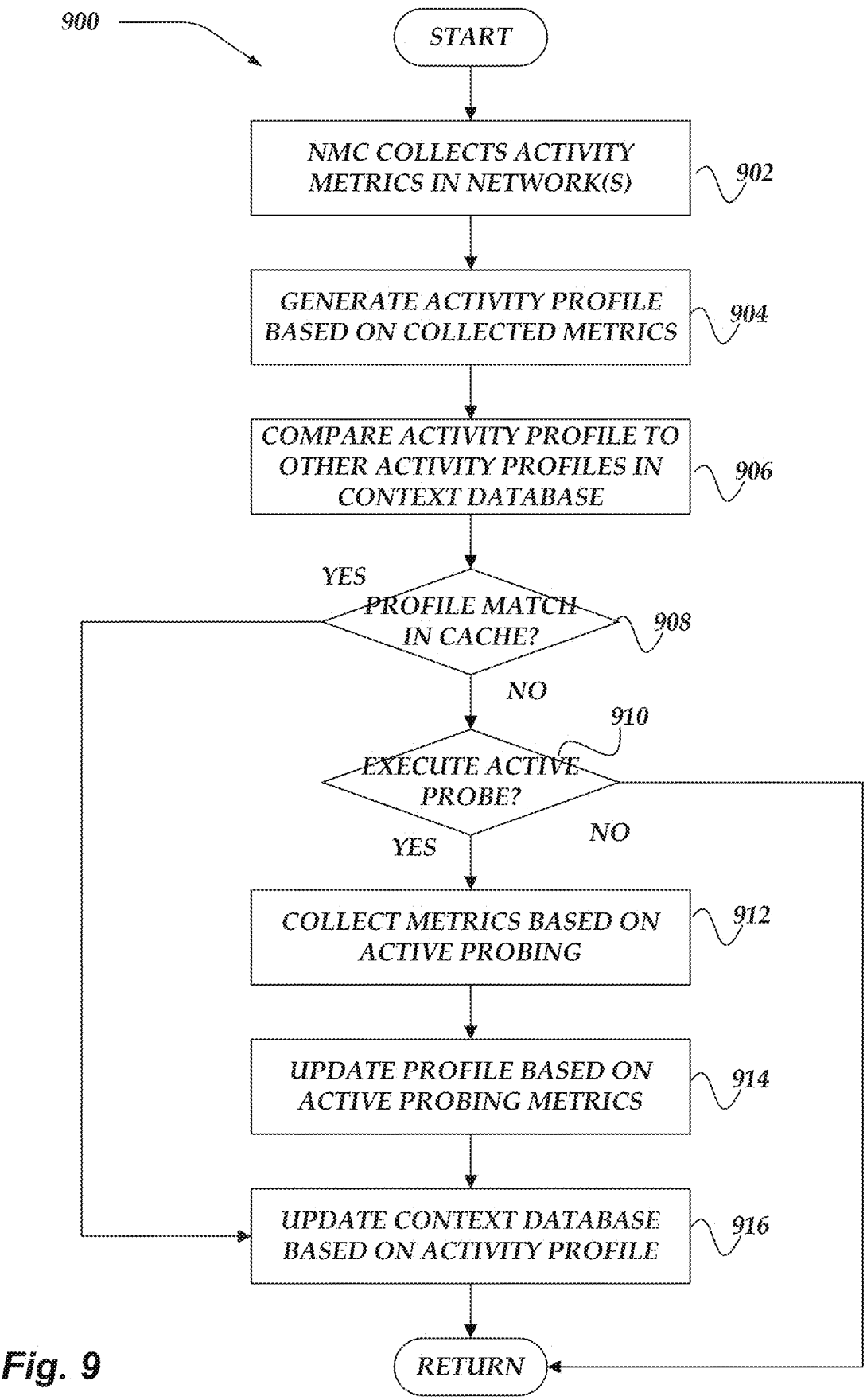
FIG. 9 illustrates a flowchart of a process for combining passive network analysis and active probing in accordance with one or more of the various embodiments.

FIG. 9 illustrates a flowchart of process 900 for combining passive network analysis and active probing in accordance with one or more of the various embodiments. After a start block, at block 902, in one or more of the various embodiments, NMCs may be arranged to collect activity metrics in one or more monitored networks. As described above, NMCs may be arranged to monitor one or more networks to identify network traffic being communicated to or from entities in the monitored networks. In some embodiments, such information may be referred to as metrics.

At block 904, in one or more of the various embodiments, NMCs may be arranged to generate one or more activity profiles based on some or all of the collected metrics.

In one or more of the various embodiments, activity profiles may be data structures for tracking metrics associated with observed network activity. In some embodiments, activity profiles may be arranged to include a set of metrics common to more than type of activity, such as, tuple information, timestamps, payload size, running total of bytes exchanged, rate of bytes exchanged, or the like. Also, in one or more of the various embodiments, activity profiles may include one or more metrics that may be associated with particular types of activities.

In one or more of the various embodiments, NMCs may be arranged to have built-in features that enable the collection of many metrics related to network traffic. In some embodiments, NMCs may be configured to use configuration information to determine the specific metrics that may be collected or included in activity profiles to account for local requirements or local circumstances.

At block 906, in one or more of the various embodiments, NMCs may be arranged to compare the one or more activity profiles to information associated with other activity profiles that may be stored in a context database.

In one or more of the various embodiments, NMCs may be arranged to compare new activity profiles to activity profiles that may be stored in a cache or context database. Accordingly, in some embodiments, NMCs may be arranged to determine, among other things, if active probes have already been used for the same or similar activity profiles. Likewise, in some embodiments, rather than generating duplicate activity profiles, NMCs may be arranged to update existing activity profiles if they may be found.

In one or more of the various embodiments, activity profiles may be associated with a timeout value. Accordingly, in some embodiments, NMCs may be arranged to discard activity profiles that become stale based on the expiry of the timeout values. Also, in some embodiments, NMCs may be configured to update a timestamp associated with activity profiles each time they are updated or accessed. Thus, in some embodiments, activity profiles associated with pending communication sessions currently being monitored may be updated with fresh timestamps to prevent them from being discarded.

In some embodiments, NMCs may be arranged to associate different timeout values with different types of activity profiles based on configuration information. For example, NMCs may be configured to associate timeout values with important activity profile types that may be longer than timeout values for other activity profiles that may be less important or otherwise considered to have short-lived relevance.

At decision block 908, in one or more of the various embodiments, if there may be profile match in the context database, control may flow to block 916; otherwise, control may flow to decision block 910.

In one or more of the various embodiments, if an activity profile may be matched, it may indicate that the activity associated with the activity profile may have been previously subject to active probing. Accordingly, in some embodiments, NMCs may be arranged to refrain from doing additional probing because the activity has already been interrogated.

In contrast, in some embodiments, if an activity profile match may not be found in the context database, the activity may be considered to be eligible for active probing.

Note, in some embodiments, in some cases, a matched activity profile may require additional or ongoing active probing. Accordingly, in some embodiments, in such cases, control may flow to block 912.

At decision block 910, in one or more of the various embodiments, if the NMC may be arranged to execute one or more active probes, control may flow to block 912; otherwise, control may be returned to a calling process.

In one or more of the various embodiments, NMCs may be arranged to enable organizations to select/configure the types of activity that may merit active probing. Accordingly, in some embodiments, NMCs may be arranged to evaluate activity profiles to determine if the information or metrics included in the activity profile indicate that it is eligible for active probing. In some embodiments, NMCs may be arranged to employ various heuristics, rules, machine learning classifiers, or the like, to evaluate if an activity profile may be eligible for active probing. For example, in some embodiments, an NMC may be configured to execute active probes if activity profiles may be associated with particular ranges of network addresses. Likewise, in some embodiments, other metrics, such as, application type, communication protocol, target entity, source entity, traffic shape, payload/packet size, or the like, may be considered. In some embodiments, some or all metrics collected by passive monitoring may be considered for determining if active probing should occur.

At block 912, in one or more of the various embodiments, NMCs may be arranged to collect one or more other metrics based on active probing. As described above, NMCs may be arranged to execute one or more actions that constitute an active probe of some or all of the entities associated with the activity profile. In some embodiments, NMCs may be arranged to submit the activity profiles of interest to a queue for later execution of active probing.

At block 914, in one or more of the various embodiments, NMCs may be arranged to update the one or more activity profiles based on the metrics determined via active probing. As described above, various active probing actions may generate a variety of metrics depending on the type of probe or the type of entity being probed.

At block 916, in one or more of the various embodiments, NMCs may be arranged to update the context database based on the one or more activity profiles. As activity profiles are updated based on active probing, the context database may be updated.

Next, in one or more of the various embodiments, control may be returned to a calling process.

Figure 10:
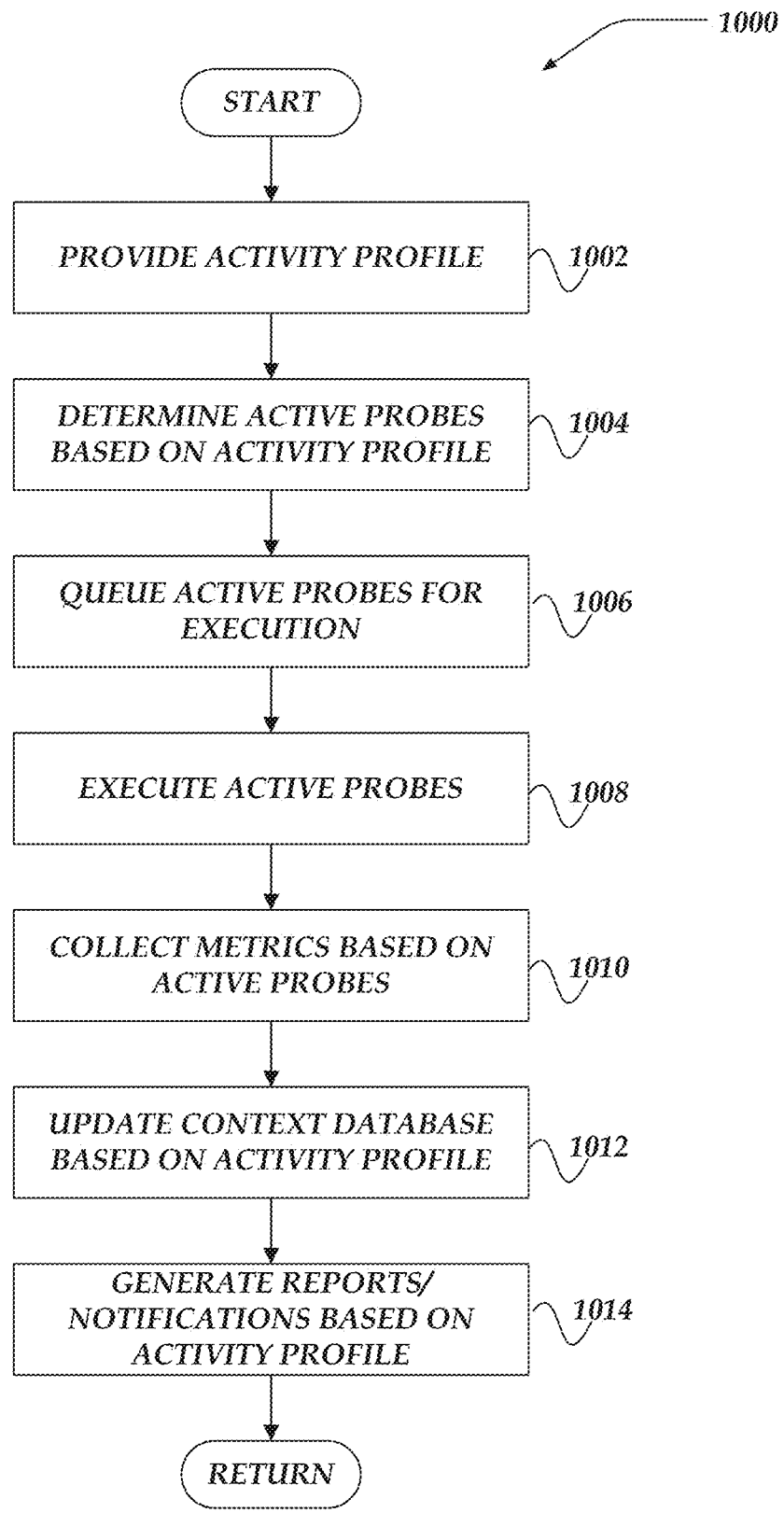
FIG. 10 illustrates a flowchart of a process for combining passive network analysis and active probing in accordance with one or more of the various embodiments.

FIG. 10 illustrates a flowchart of process 1000 for combining passive network analysis and active probing in accordance with one or more of the various embodiments. After a start block, at block 1002, in one or more of the various embodiments, NMCs may be arranged to provide an activity profile. As described above, in some embodiments, NMCs may be arranged to perform passive monitoring to determine one or more metrics that may be associated with one or more entities, connections, network traffic flows, or the like, in one or more monitored networks. Accordingly, in some embodiments, the one or more metrics may be assembled into an activity profile that may correspond to the one or more entities, connections, network traffic flows, or the like.

At block 1004, in one or more of the various embodiments, NMCs may be arranged to determine one or more active probes based on the activity profile. In one or more of the various embodiments, NMCs may be arranged to determine one or more actions for performing active probing based on the activity profile. In one or more of the various embodiments, NMCs may be arranged to classify or categorize activity profiles to determine the one or more probing actions.

In one or more of the various embodiments, NMCs may be arranged to employ one or more of heuristics, machine learning classification, or the like, or combination thereof, to associate active probe actions with an activity profile. Accordingly, in some embodiments, NMCs may be arranged to employ one or more characteristics of the network traffic corresponding to the activity profile that may be determinable from passive network monitoring.

In one or more of the various embodiments, the particular characteristics that may be visible to an NMC may vary depending on the encryption protocols, communication protocols, application protocols, or the like, used for the network traffic that corresponds to the activity profile. In some embodiments, NMCs may be arranged to determine one or more field values, header values, tuple values, or the like, that may be visible in the network activity corresponding to the activity profile. Likewise, in some embodiments, other features, such as, time-of-day, request/response timing, latency, packet rate, payload size, portions of the source tuple information (e.g., source network address, source port, or the like), portions of the destination tuple information (e.g., destination network address, destination port, or the like), request/response payload asymmetry, or the like.

Accordingly, in some embodiments, NMCs may be arranged to employ metrics assembled in activity profiles to select one or more active probe actions even though one or more characteristics or some or all of the contents of the corresponding network traffic may be encrypted or otherwise obscured from passive monitoring.

Further, in some embodiments, NMCs may be arranged to determine rules, classifiers, conditions, or the like, for mapping active probe actions to activity profiles based on configuration information. Accordingly, in some embodiments, organizations may be enabled to configure NMCs to configure NMCs to associated activity profiles with active probing based on local circumstances or local requirements.

In one or more of the various embodiments, organizations may be enabled to configure NMCs to sometimes or always perform particular active probes for specific activities while other organizations may configure NMCs to perform the same or different active probes for other activity. In some embodiments, NMCs may be arranged to enable organizations to configure one or more specific active probes to execute if network traffic (activity profiles) meet specified criteria.

In one or more of the various embodiments, NMCs may be arranged to utilize information/characteristics collected from previous active probes to determine the one or more active probe actions. Accordingly, in some embodiments, an activity profile may be enhanced based on information that may be determined from a context database. In some embodiments, if the context database includes relevant activity profile information determined from previous active probes, this information may be employed to determine the active probes if any to execute for a given activity profile. For example, previous active probes associated with similar activity previously observed may have identified one or more server applications, client applications, security/encryption protocols, or the like. Thus, in this example, the NMC may be arranged to omit one or more active probe actions directed to determining information previously learned. Accordingly, in some embodiments, these innovations may at least improve performance of network monitoring by reducing redundant active probing that may disrupt the performance of entities in the network or the network as a whole.

In one or more of the various embodiments, NMCs may be arranged to bundle the one or more actions for active probing into one or more active probing jobs that may be executed by an active probing engine. Accordingly, in some embodiments, NMCs may be enabled to continue monitoring, or the like, while active probing may be performed.

Further, in some embodiments, NMCs may be arranged to automatically recognize activity profiles that may be associated with active probe actions. Accordingly, in some embodiments, NMCs may be arranged to prevent 'feedback' loops of active probing from occurring based on network traffic/activity associated with active probe actions. For example, in some embodiments, one or more probe features, such as, IP addresses, ports, header values, payload features, timestamps, checksums, or the like, associated with pending active probes may be shared with NMCs. Accordingly, for example, the NMCs may omit activity associated with the one or more probe features from being included in activity profiles or otherwise considered for triggering active probe actions.

In one or more of the various embodiments, active probe jobs may be defined using templates. Accordingly, in some embodiments, NMCs may be arranged to insert key values, including, network addresses, ports, other tuple information, host names, user names, security credentials, various payload values, or the like. In some embodiments, job templates may be provided for various types of active probes for investigation of various types of activity. In some embodiments, NMCs may be arranged to employ instructions, scripts, templates, or the like, provided via configuration information to account for local circumstances or local requirements.

At block 1006, in one or more of the various embodiments, NMCs may be arranged to provide the one or more active probe jobs to a work queue. In one or more of the various embodiments, active probe jobs may declare one or more active probing actions that an active probe engine may execute. In one or more of the various embodiments, NMCs may be arranged to continuously monitor network traffic. Also, in some cases, the NMC may also lack network connectivity or network permission required to perform active probing on the network it monitors. Accordingly, it may be disadvantageous to pause monitoring or otherwise synchronously conduct active probing. Accordingly, in some embodiments, NMCs may be arranged to generate active probe job that may be added to a queue. In some embodiments, the active probe jobs may be comprised of data structures that include or reference instructions for performing the one or more actions for the active probed. Thus, in some embodiments, active probing engines, or the like, may be arranged to service the queued active probe jobs while the NMCs continue to execute other actions related to monitoring network traffic.

At block 1008, in one or more of the various embodiments, NMCs may be arranged to execute one or more active probes.

In one or more of the various embodiments, NMCs may be arranged to include one or more active probing engines that may be hosted on the NMCs or on different computers or compute instances.

In one or more of the various embodiments, active probing engines may be arranged to monitor one or more active probe job queues to determine if one or more active probes should be initiated. Alternatively, in some embodiments, one or more queue services providing or monitoring the active probe job queue may notify the one or more active probing engines that active probe jobs may be available.

In one or more of the various embodiments, active probing engines may be arranged to obtain one or more active probe jobs from the queue and begin performing actions declared or defined in for job.

In one or more of the various embodiments, jobs may be associated with data structures that identify or reference one or more actions that may be performed to provide active probe metrics. In some embodiments, the data structures may include instructions (e.g., scripts, or the like), that an active probing engine may execute to conduct the active probe. For example, if an active job is based on a template, it may include instructions for executing one or more actions to conduct an active probe against one or more declared targets.

At block 1010, in one or more of the various embodiments, NMCs may be arranged to collect one or more metrics based on the active probes.

In one or more of the various embodiments, one or more active probe actions may explicitly provide active probe metrics. For example, if a step in an active probe includes querying a service directory, user directory, or the like, the result of the query may be provided to the active probe engine for inclusion in the activity profile.

Also, in some embodiments, one or more active probe actions may cause the one or more target to generate network activity that may be monitored by NMCs. Accordingly, in some embodiments, one or more active probe metrics may be conventional network activity metrics that were triggered or caused by one or more active probe actions.

At block 1012, in one or more of the various embodiments, NMCs may be arranged to update the context database based on the updated activity profile. In one or more of the various embodiments, NMCs may be arranged to continuously update activity profiles using conventionally collected metrics as well as metrics collected based on active probing. In some embodiments, NMCs may be arranged to store activity profiles in a context database as to provide a reference or record of collected metrics. In some embodiments, information in context databases may include information about the active probes that may have been performed for a given activity profile. For example, such information may include a list of conducted active probes, some or all results of active probes, timestamps/age associated with active probes, or the like.

In some embodiments, updating the context database based on updated activity profiles may include resetting the expiry values that may be used to determine stale activity profiles. Accordingly, in some embodiments, activity profiles that are associated with updated metrics may remain in the context database while activity profiles that have not been updated before the expiry of one or more timeout values may be discarded.

In one or more of the various embodiments, NMCs may be arranged to associate different timeout values or different discard conditions with activity profiles depending on the type of activity profile. Accordingly, in some embodiments, NMCs may be arranged to employ timeout values, timeout conditions, discard rules, or the like, provided via configuration information to account for local requirements or local circumstances.

At block 1014, in one or more of the various embodiments, NMCs may be arranged to generate one or more reports or notifications based on the activity profiles.

In one or more of the various embodiments, NMCs may be configured to generate one or more notifications (e.g., events, alarms, log entries, messages, emails, text messages, or the like) in response to one or more activity profiles matching one or more conditions. In one or more of the various embodiments, NMCs may be configured to compare one or more metrics in activity profiles with one or more threshold value, patterns, or the like, that may be associated with one or more notifications.

In some embodiments, NMCs may be arranged to classify or categorize activity profiles based on one or more metrics. In some embodiments, different notifications or notification rules may be associated with various categories of activity profiles. For example, if an activity profile associated with a database server appears to indicate anomalous activity (e.g., multiple login attempts from unexpected source), in some embodiments, NMCs may be configured to generate one or more notifications.

In one or more of the various embodiments, NMCs may be arranged to employ template, masks, or the like, for generating notifications such that one or more values in the notification may be generated or filled-in by values extracted from related activity profiles.

In one or more of the various embodiments, reports may include interactive user interfaces (e.g., dashboards, portals, visualizations, or the like) as well as conventional report documents.

Next, in one or more of the various embodiments, control may be returned to a calling process.

Figure 11:
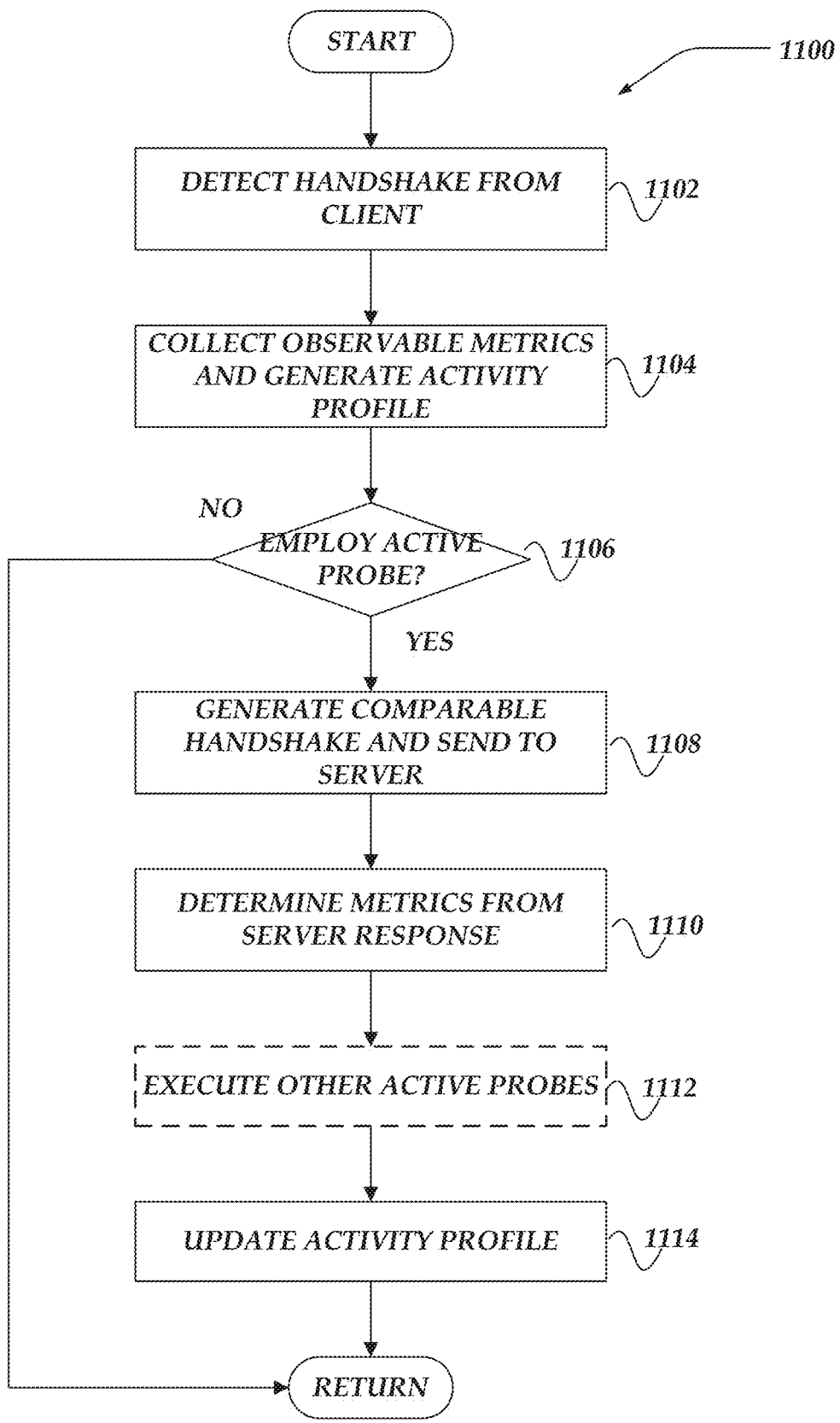
FIG. 11 illustrates a flowchart of a process for combining passive network analysis and active probing in accordance with one or more of the various embodiments.

FIG. 11 illustrates a flowchart of process 1100 for combining passive network analysis and active probing in accordance with one or more of the various embodiments. After a start block, at block 1102, in one or more of the various embodiments, NMCs may be arranged to provide to detect one or more communications that may be associated with a protocol handshake.

As described above, NMCs may be arranged to monitor network traffic to enable NMCs to determine various communication protocols, application protocols, security protocols, or the like. In some embodiments, NMCs may be arranged to recognize different phases or parts of a communication session, such as, handshake exchanges used to establish a session for a given protocol.

Accordingly, in some embodiments, NMCs may be configured to determine if monitored network traffic may be associated with one or more protocols based on observing or detecting communication exchanges associated handshakes for the one or more protocols. In some cases, the handshake exchanges between clients and servers may include information that may be useful, including, information that may be used to identify the protocol, information determining roles of session participants (e.g., clients v. servers), information that may be used to correlate network traffic, or the like. In some embodiments, for some protocols, NMCs may be enabled to identify a protocol based on well-known fields/values that may be observed directly in the network traffic. As described above, NMCs may be arranged to 'follow' protocol handshakes based on comparing the traffic to a database of protocol handshake characteristics. Thus, in some cases, NMCs may identify if two or more entities in the network may be establishing a connection or session.

In some cases, one or more portions of a handshake may be obscured by encrypted. Accordingly, in some embodiments, NMCs may determine some handshakes based on the 'shape' of observed network traffic. Thus, in some embodiments, if the communication pattern (e.g., timing, data/payload size, or the like) matches the communication pattern of known protocol handshake, NMCs may infer that a handshake may be in process.

Also, in one or more of the various embodiments, NMCs may be arranged to employ machine learning-based models trained for identify protocol handshakes to determine if network traffic may be associated with one or more protocol handshakes.

At block 1104, in one or more of the various embodiments, NMCs may be arranged to collect one or more metrics from the handshake communication for generating an activity profile. As described above, the metrics available an NMC may depend on one or more of the communication protocol, application protocol, encryption, or the like, comprising the monitored network traffic.

However, one or more metrics or characteristics of the communication (if any) that can be determine from the monitored network traffic may be collected and included in an activity profile. For example, in some cases, tuple information associated with the observed activity may be available and associated with the activity using an activity profile.

In one or more of the various embodiments, NMCs may be arranged to infer one or more characteristics/features of the activity to include in the activity profile. For example, in some cases, NMCs may recognize one or more metrics or features in the network traffic that suggest more than one protocol even though the NMC cannot confirm which specific protocol is being used. Accordingly, in some embodiments, NMCs may be arranged to include a list of candidate protocols in activity profiles.

At decision block 1106, in one or more of the various embodiments, if active probes may be employed, control may flow to block 1108; otherwise, control may be returned to a calling process. In one or more of the various embodiments, NMCs may be arranged to evaluate the activity profiles associated with the network traffic to determine if active probes should be conducted. For example, in some cases, NMCs may be configured to use active probes for specific protocols. Likewise, NMCs may be configured to limit active probes to activity that may be associated with activity profiles associated with specific metric values.

At block 1108, in one or more of the various embodiments, NMCs may be arranged to generate one or more associated handshake messages and provide them to the server targeted by the observed handshakes.

In some cases, NMCs may be enabled to observe that clients or servers may be using a given protocol by observing the initial handshake exchanges. For example, in some cases, the NMC may determine that a client has initiated a handshake with a server but the server response may be obscured from the NMC by encryption applied to the communication subsequent the client's initial request.

Accordingly, in some cases, for some embodiments, it may be advantageous for an NMC to send a request to server of interest that mimics or uses the same protocol as the client's initial handshake request. Accordingly, in some cases, the NMCs may be enabled to observe the server's response to learn more about the connection/session between the client and the server.

At block 1110, in one or more of the various embodiments, NMCs may be arranged to determine one or more metrics based on the server response(s) to the handshake messages provided by the NMC. In one or more of the various embodiments, depending on the protocols involved, a variety of metrics may be determined based on server responses, such as, application versions, protocols being using, security/encryption feature availability, or the like.

For example, in some embodiments, if the protocol includes a feature for negotiating encryption/security features to use for a session, NMCs may be configured to conduct such a negotiation to evaluate the security protocols that may be in place based on a server's response to the NMC's negotiations. Accordingly, for example, NMCs may determine if a server is using approved encryption ciphers, key lengths, or the like.

At block 1112, in one or more of the various embodiments, optionally, NMCs may be arranged to perform one or more other actions for one or more other active probes. As described above, the particular active probing actions may vary depending on the activity profiles and NMC configuration. Accordingly, in some cases, for some embodiments, there may be additional active probes to perform in addition to initiating a handshake.

Note, this block is indicated as being optional because in some case the handshake generation may be the only active probe being conducted. In other cases, more active probes may be employed alongside the handshake generation.

At block 1114, in one or more of the various embodiments, NMCs may be arranged to update the activity profile based on the one or more metrics determined from the server response.

In one or more of the various embodiments, NMCs may be arranged to update activity profiles with information determined from interacting with the same server as a client associated with the activity profile. The specific metrics made available by sending handshake traffic to a server may vary depending on the protocols involved. Accordingly, NMCs may be arranged to determine specific metrics for including in activity profiles based on rules, instructions, filters, or the like, provided by configuration information to account for local requirements or local circumstances.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring communication over a network between one or more computers, with one or more network monitoring computers (NMCs) that perform actions, comprising:
    determining one or more metrics based on monitoring network traffic associated with one or more entities in the network, wherein the one or more metrics are included in one or more profiles, and wherein each entity is associated with a profile based on the network traffic;
    comparing the one or more profiles with one or more other profiles in a context database based on the one or more metrics included in each profile and each other profile; and
    in response to the one or more profiles being unmatched by one or more other profiles, performing, further actions, including:
        determining one or more active probes to include in one or more jobs based on the one or more profiles;
        executing the one or more jobs to collect one or more other metrics that are generated by the one or more active probes and querying one or more of a service directory, a user directory, a configuration service, or a system database;
        updating the one or more profiles based on the one or more other metrics that include one or more responses to the query; and
        storing the one or more updated profiles in the context database; and
    in response to the one or more profiles being matched by the one or more other profiles in the context database, updating a timestamp associated with the one or more other profiles to a current time value; and
    generating one or more reports that include information associated with the one or more entities and the one or more profiles or the one or more updated profiles.

2. The method of claim 1, wherein executing the one or more jobs to collect the one or more other metrics, further comprises:
    determining a portion of the network traffic that is associated with a protocol handshake directed to an entity in the monitored network;
    collecting one or more observable metrics from the portion of network traffic associated with the protocol handshake, wherein the one or more observable metrics are included in a profile corresponding to the entity; and
    in response to the profile being unmatched by another profile in the context database, performing, further actions, including:
        providing one or more messages that mimic one or more portions of the protocol handshake to the entity;
        determining a portion of the one or more other metrics based on one or more responses to the one or more messages; and
        updating the profile based on the portion of the one or more other metrics.

3. The method of claim 1, wherein determining the one or more active probes to include in the one or more jobs, further comprises:
    excluding a portion of the one or more entities from the one or more active probes based on one or more of an application type, a communication protocol, a target entity, a source entity, a traffic shape, a range of source network addresses, a range of target network addresses, or a payload/packet size associated with the one or more excluded entities.

4. The method of claim 1, wherein executing the one or more jobs to collect the one or more other metrics, further comprises:
    generating one or more network packets that include one or more of a network address, a port, other tuple information, a host name, a user name, or a security credential;
    communicating the one or more network packets to a portion of the one or more entities associated with the one or more unmatched profiles;
    monitoring a portion of the network traffic associated with the one or more network packets to determine a portion of the one or more other metrics including one or more response network packets; and
    updating the profile based on the portion of the one or more other metrics.

5. The method of claim 1, wherein executing the one or more jobs to collect the one or more other metrics, further comprises:
    initiating one or more active probes that communicate with a portion of the one or more entities associated with the one or more unmatched profiles;
    determining a portion of the one or more other metrics based on the one or more active probes; and
    updating the profile based on the portion of the one or more other metrics.

6. The method of claim 1, further comprising:
    adding the one or more jobs to a queue; and
    executing the one or more jobs in turn based on the queue.

7. A processor readable non-transitory storage media that includes instructions for monitoring network traffic using one or more network monitoring computers, wherein execution of the instructions by the one or more networking monitoring computers perform the method comprising:
  determining one or more metrics based on monitoring network traffic associated with one or more entities in the network, wherein the one or more metrics are included in one or more profiles, and wherein each entity is associated with a profile based on the network traffic;
  comparing the one or more profiles with one or more other profiles in a context database based on the one or more metrics included in each profile and each other profile; and
  in response to the one or more profiles being unmatched by one or more other profiles, performing, further actions, including:
    determining one or more active probes to include in one or more jobs based on the one or more profiles;
    executing the one or more jobs to collect one or more other metrics that are generated by the one or more active probes and querying one or more of a service directory, a user directory, a configuration service, or a system database;
    updating the one or more profiles based on the one or more other metrics that include one or more responses to the query; and
    storing the one or more updated profiles in the context database; and
  in response to the one or more profiles being matched by the one or more other profiles in the context database, updating a timestamp associated with the one or more other profiles to a current time value; and
  generating one or more reports that include information associated with the one or more entities and the one or more profiles or the one or more updated profiles.

8. The media of claim 7, wherein executing the one or more jobs to collect the one or more other metrics, further comprises:
  determining a portion of the network traffic that is associated with a protocol handshake directed to an entity in the monitored network;
  collecting one or more observable metrics from the portion of network traffic associated with the protocol handshake, wherein the one or more observable metrics are included in a profile corresponding to the entity; and
  in response to the profile being unmatched by another profile in the context database, performing, further actions, including:
    providing one or more messages that mimic one or more portions of the protocol handshake to the entity;
    determining a portion of the one or more other metrics based on one or more responses to the one or more messages; and
    updating the profile based on the portion of the one or more other metrics.

9. The media of claim 7, wherein determining the one or more active probes to include in the one or more jobs, further comprises:
  excluding a portion of the one or more entities from the one or more active probes based on one or more of an application type, a communication protocol, a target entity, a source entity, a traffic shape, a range of source network addresses, a range of target network addresses, or a payload/packet size associated with the one or more excluded entities.

10. The media of claim 7, wherein executing the one or more jobs to collect the one or more other metrics, further comprises:
  generating one or more network packets that include one or more of a network address, a port, other tuple information, a host name, a user name, or a security credential;
  communicating the one or more network packets to a portion of the one or more entities associated with the one or more unmatched profiles;
  monitoring a portion of the network traffic associated with the one or more network packets to determine a portion of the one or more other metrics including one or more response network packets; and
  updating the profile based on the portion of the one or more other metrics.

11. The media of claim 7, wherein executing the one or more jobs to collect the one or more other metrics, further comprises:
  initiating one or more active probes that communicate with a portion of the one or more entities associated with the one or more unmatched profiles;
  determining a portion of the one or more other metrics based on the one or more active probes; and
  updating the profile based on the portion of the one or more other metrics.

12. The media of claim 7, further comprising:
  adding the one or more jobs to a queue; and
  executing the one or more jobs in turn based on the queue.

13. A network monitoring computer (NMC) for monitoring network traffic between one or more computers, comprising:
  a transceiver that communicates over the network;
  a memory that stores at least instructions; and
  one or more processors that execute instructions that perform actions, including:
    determining one or more metrics based on monitoring network traffic associated with one or more entities in the network, wherein the one or more metrics are included in one or more profiles, and wherein each entity is associated with a profile based on the network traffic;
    comparing the one or more profiles with one or more other profiles in a context database based on the one or more metrics included in each profile and each other profile; and
    in response to the one or more profiles being unmatched by one or more other profiles, performing, further actions, including:
      determining one or more active probes to include in one or more jobs based on the one or more profiles;
      executing the one or more jobs to collect one or more other metrics that are generated by the one or more active probes and querying one or more of a service directory, a user directory, a configuration service, or a system database;
      updating the one or more profiles based on the one or more other metrics that include one or more responses to the query; and
      storing the one or more updated profiles in the context database; and
    in response to the one or more profiles being matched by the one or more other profiles in the context database, updating a timestamp associated with the one or more other profiles to a current time value; and generating one or more reports that include information associated with the one or more entities and the one or more profiles or the one or more updated profiles.

14. The NMC of claim 13, wherein executing the one or more jobs to collect the one or more other metrics, further comprises:
determining a portion of the network traffic that is associated with a protocol handshake directed to an entity in the monitored network;
collecting one or more observable metrics from the portion of network traffic associated with the protocol handshake, wherein the one or more observable metrics are included in a profile corresponding to the entity; and
in response to the profile being unmatched by another profile in the context database, performing, further actions, including:
providing one or more messages that mimic one or more portions of the protocol handshake to the entity;
determining a portion of the one or more other metrics based on one or more responses to the one or more messages; and
updating the profile based on the portion of the one or more other metrics.

15. The NMC of claim 13, wherein determining the one or more active probes to include in the one or more jobs, further comprises:
excluding a portion of the one or more entities from the one or more active probes based on one or more of an application type, a communication protocol, a target entity, a source entity, a traffic shape, a range of source network addresses, a range of target network addresses, or a payload/packet size associated with the one or more excluded entities.

16. The NMC of claim 13, wherein executing the one or more jobs to collect the one or more other metrics, further comprises:
generating one or more network packets that include one or more of a network address, a port, other tuple information, a host name, a user name, or a security credential;
communicating the one or more network packets to a portion of the one or more entities associated with the one or more unmatched profiles;
monitoring a portion of the network traffic associated with the one or more network packets to determine a portion of the one or more other metrics including one or more response network packets; and
updating the profile based on the portion of the one or more other metrics.

17. The NMC of claim 13, wherein executing the one or more jobs to collect the one or more other metrics, further comprises:
initiating one or more active probes that communicate with a portion of the one or more entities associated with the one or more unmatched profiles;
determining a portion of the one or more other metrics based on the one or more active probes; and
updating the profile based on the portion of the one or more other metrics.

18. The NMC of claim 13, wherein the one or more processors execute instructions that perform actions, further comprising:
adding the one or more jobs to a queue; and
executing the one or more jobs in turn based on the queue.

19. A system for monitoring network traffic in a network:
one or more network monitoring computers (NMCs), comprising:
a transceiver that communicates over the network;
a memory that stores at least instructions; and
one or more processors that execute instructions that perform actions, including:
determining one or more metrics based on monitoring network traffic associated with one or more entities in the network, wherein the one or more metrics are included in one or more profiles, and wherein each entity is associated with a profile based on the network traffic;
comparing the one or more profiles with one or more other profiles in a context database based on the one or more metrics included in each profile and each other profile; and
in response to the one or more profiles being unmatched by one or more other profiles, performing, further actions, including:
determining one or more active probes to include in one or more jobs based on the one or more profiles;
executing the one or more jobs to collect one or more other metrics that are generated by the one or more active probes and querying one or more of a service directory, a user directory, a configuration service, or a system database;
updating the one or more profiles based on the one or more other metrics that include one or more responses to the query; and
storing the one or more updated profiles in the context database; and
in response to the one or more profiles being matched by the one or more other profiles in the context database, updating a timestamp associated with the one or more other profiles to a current time value; and
generating one or more reports that include information associated with the one or more entities and the one or more profiles or the one or more updated profiles; and
one or more client computers, comprising:
a transceiver that communicates over the network;
a memory that stores at least instructions; and
one or more processors that execute instructions that perform actions, including:
providing one or more portions of the network traffic.

20. The system of claim 19, wherein executing the one or more jobs to collect the one or more other metrics, further comprises:
determining a portion of the network traffic that is associated with a protocol handshake directed to an entity in the monitored network;
collecting one or more observable metrics from the portion of network traffic associated with the protocol handshake, wherein the one or more observable metrics are included in a profile corresponding to the entity; and
in response to the profile being unmatched by another profile in the context database, performing, further actions, including:
providing one or more messages that mimic one or more portions of the protocol handshake to the entity;

determining a portion of the one or more other metrics based on one or more responses to the one or more messages; and updating the profile based on the portion of the one or more other metrics.

21. The system of claim 19, wherein determining the one or more active probes to include in the one or more jobs, further comprises:

excluding a portion of the one or more entities from the one or more active probes based on one or more of an application type, a communication protocol, a target entity, a source entity, a traffic shape, a range of source network addresses, a range of target network addresses, or a payload/packet size associated with the one or more excluded entities.

22. The system of claim 19, wherein executing the one or more jobs to collect the one or more other metrics, further comprises:

generating one or more network packets that include one or more of a network address, a port, other tuple information, a host name, a user name, or a security credential;

communicating the one or more network packets to a portion of the one or more entities associated with the one or more unmatched profiles;

monitoring a portion of the network traffic associated with the one or more network packets to determine a portion of the one or more other metrics including one or more response network packets; and updating the profile based on the portion of the one or more other metrics.

23. The system of claim 19, wherein executing the one or more jobs to collect the one or more other metrics, further comprises:

initiating one or more active probes that communicate with a portion of the one or more entities associated with the one or more unmatched profiles;

determining a portion of the one or more other metrics based on the one or more active probes; and updating the profile based on the portion of the one or more other metrics.

24. The system of claim 19, wherein the one or more NMC processors execute instructions that perform actions, further comprising:

adding the one or more jobs to a queue; and executing the one or more jobs in turn based on the queue.

* * * * *